United States Patent
Crespo Guitérrez et al.

(10) Patent No.: US 12,431,705 B2
(45) Date of Patent: Sep. 30, 2025

(54) AUTONOMOUS ENERGY SYSTEM FOR AN AIRCRAFT

(71) Applicant: Airbus Operations S.L., Getafe (ES)

(72) Inventors: Ignacio Crespo Guitérrez, Getafe (ES); Carlos Hernandez Hidalgo, Getafe (ES)

(73) Assignee: Airbus Operations S.L., Getafe (ES)

( * ) Notice: Subject to any disclaimer, the term of this patent is extended or adjusted under 35 U.S.C. 154(b) by 0 days.

(21) Appl. No.: 18/676,101

(22) Filed: May 28, 2024

(65) Prior Publication Data
US 2024/0405541 A1    Dec. 5, 2024

(30) Foreign Application Priority Data

May 30, 2023   (EP) ..................................... 23382509

(51) Int. Cl.
*H02J 1/10* (2006.01)
*B64D 47/00* (2006.01)
(Continued)

(52) U.S. Cl.
CPC ............... *H02J 1/10* (2013.01); *B64D 47/00* (2013.01); *H01M 10/0525* (2013.01); *H01M 10/425* (2013.01); *H02J 1/08* (2013.01); *H02J 7/34* (2013.01); *B64D 2221/00* (2013.01); *H01M 2010/4271* (2013.01); *H01M 2220/20* (2013.01); *H02J 2207/20* (2020.01); *H02J 2207/50* (2020.01)

(58) Field of Classification Search
None
See application file for complete search history.

(56) References Cited

U.S. PATENT DOCUMENTS

| | | | |
|---|---|---|---|
| 2014/0197681 A1* | 7/2014 | Iwashima | B60L 53/55 307/9.1 |
| 2016/0105030 A1* | 4/2016 | Neuhaus | H02J 5/00 700/298 |

(Continued)

OTHER PUBLICATIONS

European Search Report for corresponding European Patent Application No. 23382509 dated Nov. 15, 2023.

*Primary Examiner* — Rexford N Barnie
*Assistant Examiner* — Aqeel H Bukhari
(74) *Attorney, Agent, or Firm* — Greer, Burns & Crain, Ltd.

(57) ABSTRACT

An autonomous energy system for an aircraft with a high voltage network, a main power source, an energy storage, a bidirectional DC-DC converter, and a power control management system connected to: the high voltage network to measure its voltage variations, and to the energy storage and to the DC-DC converter forming an energy buffer module providing/receiving a fixed voltage setpoint to the high voltage network; and being configured so that, when the power control management system detects that the voltage variation ($\Delta V_{r\_network}$, $\Delta V_{d\_network}$) of the high voltage network is higher than preset voltage discharge/charge activation thresholds during a time higher than preset time discharge/charge activation values, the power control management system provides/receives power from the energy buffer module to the high voltage network until a preconfigured condition is met.

7 Claims, 7 Drawing Sheets

(51) Int. Cl.
     *H01M 10/0525*    (2010.01)
     *H01M 10/42*    (2006.01)
     *H02J 1/08*    (2006.01)
     *H02J 7/34*    (2006.01)

(56) References Cited

U.S. PATENT DOCUMENTS

| | | |
|---|---|---|
| 2017/0040795 A1 | 2/2017 | Jung et al. |
| 2019/0004580 A1 | 1/2019 | Wilhide |
| 2020/0136423 A1* | 4/2020 | Haxhiu ............. H01M 8/04888 |
| 2022/0258876 A1 | 8/2022 | Dasgupta et al. |

\* cited by examiner

AUTONOMOUS ENERGY SYSTEM FOR AN AIRCRAFT

CROSS-REFERENCES TO RELATED APPLICATIONS

This application claims the benefit of European Patent Application Number 23382509.0 filed on May 30, 2023, the entire disclosure of which is incorporated herein by way of reference.

FIELD OF THE INVENTION

The present invention relates to an autonomous energy system for an aircraft designed to be used as a secondary power source, to help a main power source (a fuel cell) to deliver the required power or to prevent its accelerated aging.

BACKGROUND OF THE INVENTION

Fuel cell powered vehicles are well known, but the use of this power supply in the aerospace sector is a novelty nowadays.

Ground vehicles such as heavy or light vehicles use fuel cells as the main power source with the support of an energy buffer. These ground vehicles usually have an energy buffer with a DC-DC converter connected in parallel with the fuel cell to take advantage of the regenerative braking and to support the fuel cell in accelerating conditions. The vast majority of ground vehicles use Li-Ion batteries as an energy buffer, but some vehicles use supercapacitors for some functions that require high power demand in short periods of time.

The ground vehicles usually have an electronic control unit (ECU) to calculate the amount of power to deliver by the fuel cell and by the energy buffer. Usually, they use some lock-up tables where from the power that should deliver the fuel cell, its voltage and, therefore, the network voltage is calculated.

The calculated voltage is the voltage that the high side of the energy buffer's DC-DC converter shall have.

The current energy buffers systems can be passive or active.

A passive energy buffer is a supercapacitor bank connected in parallel with the fuel cell, mitigating the power instabilities of the network. The matter of this type of energy buffer is that the power distribution is uncontrolled and depends directly on the impedance of each component.

An active energy buffer consists of a supercapacitor bank and a DC-DC converter connected in parallel with a fuel cell to support the network with the needed power. The advantage of this system is that it is possible to control the power but depends on the power control management system that calculates periodically, e.g., every 100 ms, the DC-DC current set point that the buffer shall inject into the network. For that reason, the active energy buffers are not as reactive as it is desired.

SUMMARY OF THE INVENTION

Therefore, an objective of the present invention is to provide an energy system that can autonomously decide if the network needs support, and in which the DC-DC converter is bidirectional and voltage-controlled (with a voltage setpoint (threshold)), in order to be more agile and use a simpler control.

With the energy system of the invention the state of the art disadvantages are solved, presenting other advantages that will be described below.

The autonomous energy system for an aircraft according to the present invention is described in one or more embodiments described herein.

In particular, the autonomous energy system for an aircraft may generally comprise:

a high voltage network capable to provide energy to aircraft electrical loads, a main power source connected to the high voltage network, an energy storage, a voltage-controlled bidirectional DC-DC converter connected to the energy storage and to the high voltage network, and, a power control management system, wherein the power control management system is connected to the high voltage network to be able to measure its voltage variations, wherein the power control management system is connected to the energy storage (3) and to the DC-DC converter (4) to form an energy buffer module (1) capable of providing and receiving a determined amount of power by a fixed voltage setpoint ($V_{set\text{-}point}$) to the high voltage network (6), wherein the power control management system (5) is configured so that when the power control management system (5) detects that the voltage drop variation ($\Delta V_{d\_network}$) of the high voltage network (6) is higher than a preset voltage discharge activation threshold ($V_{th\_d\_network\_discharge\_act}$) during a time ($\Delta t_{d\_network}$) higher than a preset time discharge activation value ($t_{th\_d\_network\_discharge\_act}$), the power control management system (5) provides power from the energy buffer module (1) to the high voltage network (6) until one of the following conditions are met:

the current provided by the energy buffer module ($I_{buffer}$) (1) is lower than a first preset threshold discharge deactivation value ($I_{th\_buffer\_discharge\_deact1}$) during a time ($\Delta t_{buffer}$) higher than a first preset discharge deactivation time ($t_{th\_buffer\_discharge\_deact1}$), and the charge of the energy storage (3) is lower than a minimum usable charge, and the voltage rise variation of the high voltage network ($\Delta V_{r\_network}$) (6) is higher than a preset rise drop discharge deactivation threshold ($V_{th\_r\_network\_discharge\_deact}$) and the current provided by the energy buffer module ($I_{buffer}$) (1) is lower than a second preset threshold discharge deactivation value ($I_{th\_buffer\_discharge\_deact2}$) during a time ($\Delta t_{buffer}$) higher than a second preset discharge deactivation time ($t_{th\_buffer\_discharge\_deact2}$), and wherein the power control management system (5) is configured so that when the power control management system (5) detects that the voltage rise variation ($\Delta V_{r\_network}$) of the high voltage network (6) is higher than a preset voltage charge activation threshold ($V_{th\_r\_network\_charge\_act}$) during a time ($\Delta t_{network}$) higher than a preset time charge activation value ($t_{th\_r\_network\_charge\_act}$), the power control management system (5) receives power from the high voltage network (6) to the energy buffer module (1) until one of the following conditions are met:

the current provided by the energy buffer module ($I_{buffer}$) (1) is lower than a first preset threshold charge deactivation value ($I_{th\_buffer\_charge\_deact1}$) during a time ($\Delta t_{buffer}$) higher than a first preset charge deactivation time ($t_{th\_buffer\_charge\_deact1}$), and the charge of the energy storage (3) is higher than a maximum usable charge, and the voltage drop variation of the high voltage network ($\Delta V_{d\_network}$) (6) is higher than a preset voltage drop charge deactivation threshold ($V_{th\_d\_network\_charge\_deact}$) and the current provided by the energy buffer module ($I_{buffer}$) (1) is lower than a second preset threshold charge deactivation value ($I_{th\_buffer\_charge\_deact2}$) during a time ($\Delta t_{buffer}$) higher than a second preset charge deactivation time ($t_{th\_buffer\_charge\_deact2}$).

According to a preferred embodiment, the fixed voltage setpoint ($V_{set-point}$) provided by the energy buffer module is determined from the voltage values of the high voltage network during a preset set-point time range ($t_{set-point}$).

Preferably, the fixed voltage setpoint ($V_{set-point}$) is determined as the average of the voltage values of the high voltage network during the preset set-point time range ($t_{set-point}$).

Preferably, the preset set-point time range ($t_{set\_point}$) is established before a preset set-point back-time range ($t_{set\_point\_backpoint}$), said preset set-point back-time range ($t_{set\_point\_backpoint}$) comprising the time passed between the end of the preset set-point time range ($t_{set\_point}$) and the current time ($t_{current}$).

According to another preferred embodiment, the energy storage and the DC-DC converter are connected in series.

According to another preferred embodiment, the energy storage is a bank of supercapacitors or lithium-ion (Li-on) batteries.

According to another preferred embodiment, the minimum usable charge of the energy storage is lower than 20% of its entire charge, and the maximum usable charge of the energy storage is higher than 80% of its entire charge.

With the autonomous energy system according to the present invention, the following advantages are obtained, among others:

It works autonomously;

Its control is easier than the conventional active energy buffers, providing a stable voltage set point;

Its integration is easier than the conventional active energy buffers;

Its lighter and more controllable than the conventional passive energy buffers;

It provides a fast reaction time, mainly in power oscillations.

BRIEF DESCRIPTION OF THE DRAWINGS

For better understanding of what has been disclosed, some drawings in which, schematically and only by way of a non-limiting example, a practical case of embodiment is shown.

DETAILED DESCRIPTION OF THE PREFERRED EMBODIMENTS

Figure 1:
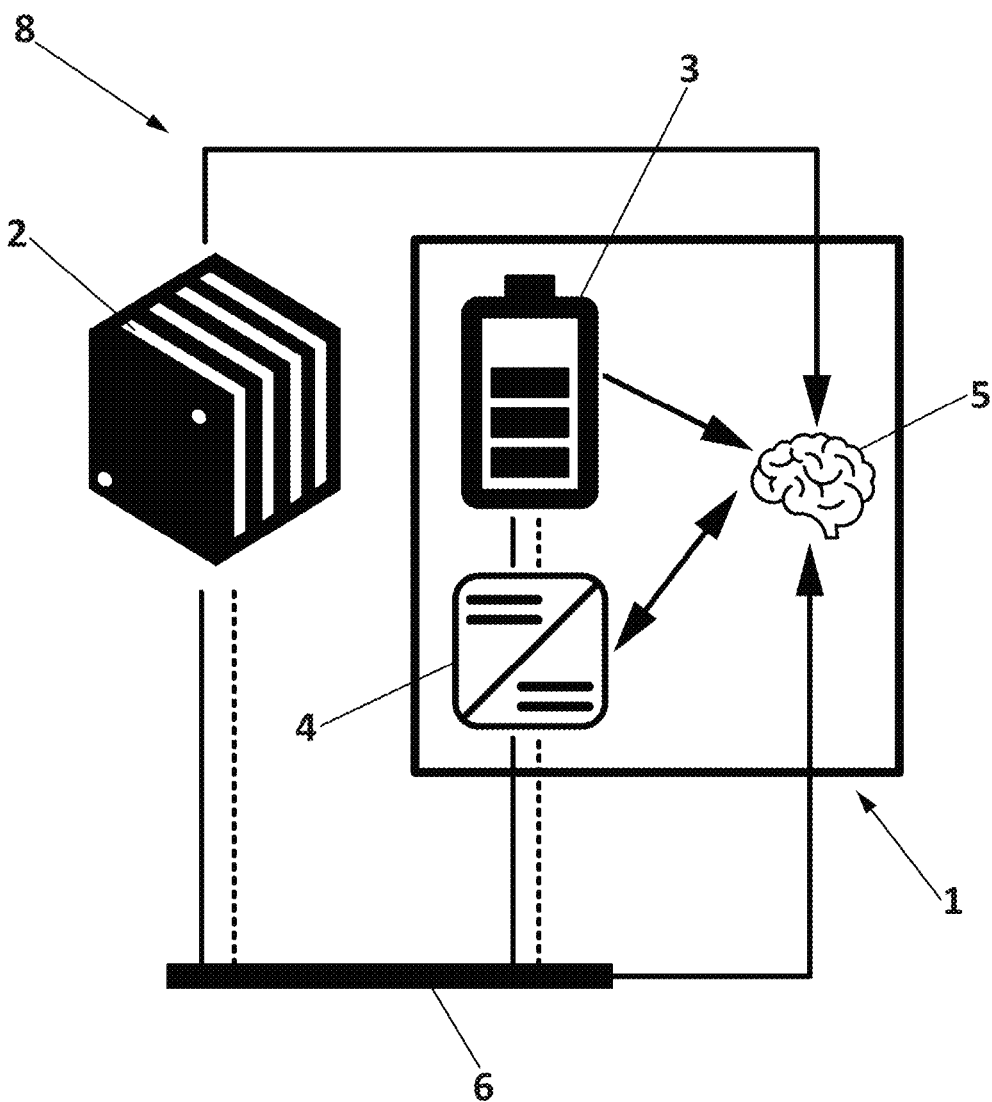
FIG. 1 is a diagrammatical view of the autonomous energy system according to the present invention.

The autonomous energy system for an aircraft according to the present invention, indicated generally with reference number 8, comprises an energy buffer module 1 used to support a main power source 2, which is, in this embodiment, a fuel cell, and a high voltage network 6 able to provide and receive power from the energy buffer module 1.

The energy buffer module 1 mainly supports the fuel cell to soften the fast power oscillations, preventing premature aging of the fuel cell.

In addition, the energy buffer module 1 of the invention helps to reduce the time to reach the peak power demands when the fuel cell by itself is slower than the requested reaction times.

The energy buffer module 1 comprises an energy storage 3, in this embodiment a bank of supercapacitors, to provide the high voltage network 6 with the required power, and a voltage-controlled bidirectional DC-DC converter 4, to adapt the supercapacitors output voltage to the voltage of the high voltage network 6. Additionally, the energy buffer module 1 comprises a power control management system 5 which, being connected to the energy storage 3 and to the DC-DC converter 4 is able to control the delivered power.

Due to the high power and low energy of the power profiles used to design the energy buffer module 1, the supercapacitor technology was selected in this embodiment instead of the Li-ion battery cells due to its higher power density. On the other hand, the supercapacitors have the advantage that are more stable in high temperature conditions than the Li-ion cells, not affected by full discharge scenarios and less reactive under failures.

Figure 2:
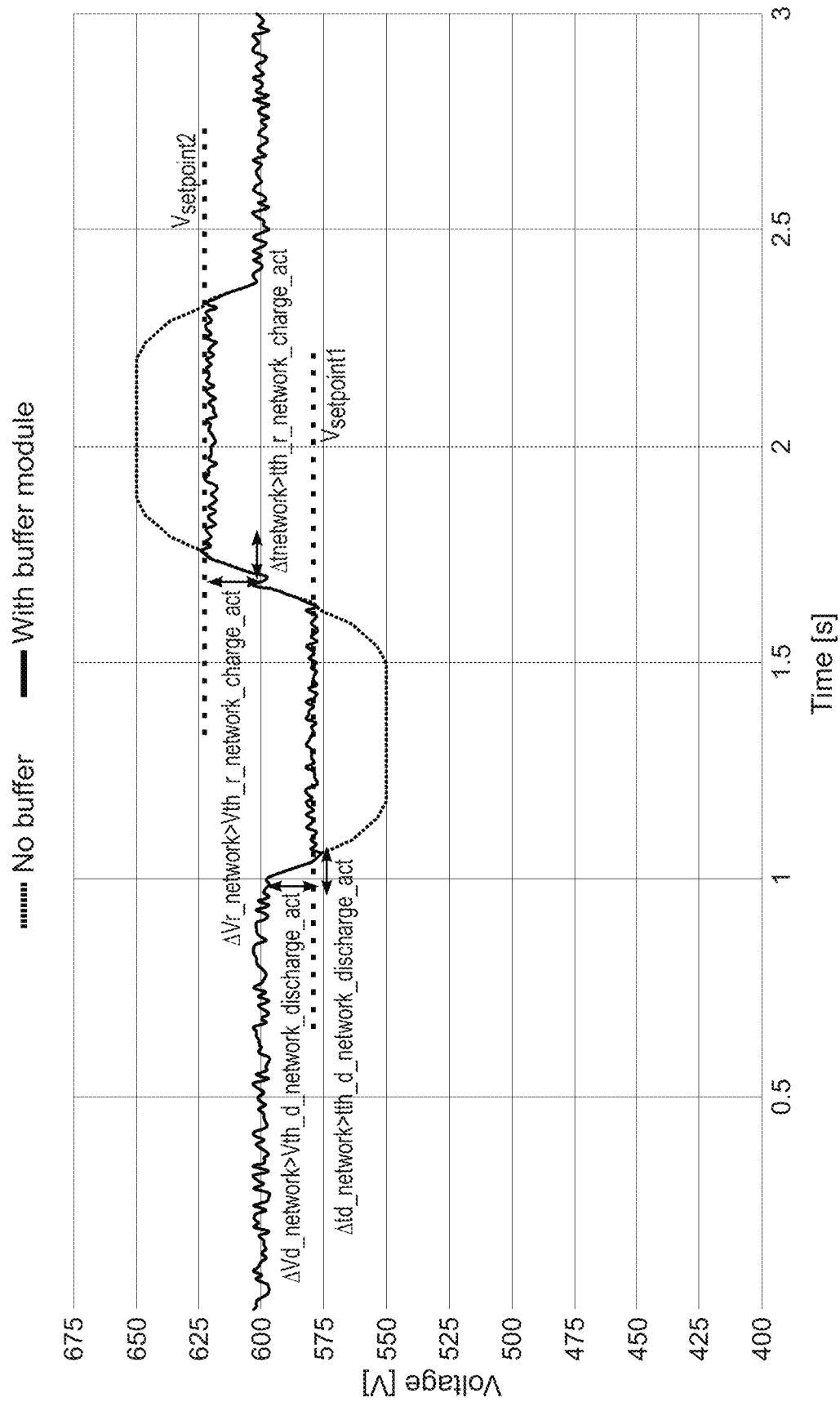
FIG. 2 is a graphic showing the voltage along time, comparing the operation of the autonomous energy system according to the present invention with an energy system with and without the buffer module.

As mentioned, the power control management system 5 of the energy buffer module 1 is connected to the energy storage 3, the high voltage network 6, and the voltage-controlled bidirectional DC-DC converter 4, for receiving and/or sending information and/or commands. So that, when the power control management system 5 detects a high voltage network 6 instability, is capable of supporting the main power source 2 by itself with electrical power. To this end, as shown in FIG. 2, when the power control management system (5) detects that the voltage drop variation ($\Delta V_{d\_network}$) of the high voltage network (6) is higher than a preset voltage discharge activation threshold ($V_{th\_d\_network\_discharge\_act}$) during a time ($\Delta t_{d\_network}$) higher than a preset time discharge activation value ($t_{th\_d\_network\_discharge\_act}$), the power control management system (5) provides power from the energy buffer module (1) to the high voltage network (6) until one of a set of discharge deactivation conditions are met; and wherein the power control management system (5) is configured so that when the power control management system (5) detects that the voltage rise variation ($\Delta V_{r\_network}$) of the high voltage network (6) is higher than a preset voltage charge activation threshold ($V_{th\_r\_network\_charge\_act}$) during a time ($\Delta t_{network}$) higher than a preset time charge activation value ($t_{th\_r\_network\_charge\_act}$), the power control management system (5) receives power from the high voltage network (6) to the energy buffer module (1) until one of a set of charge deactivation conditions are met.

Figure 3:
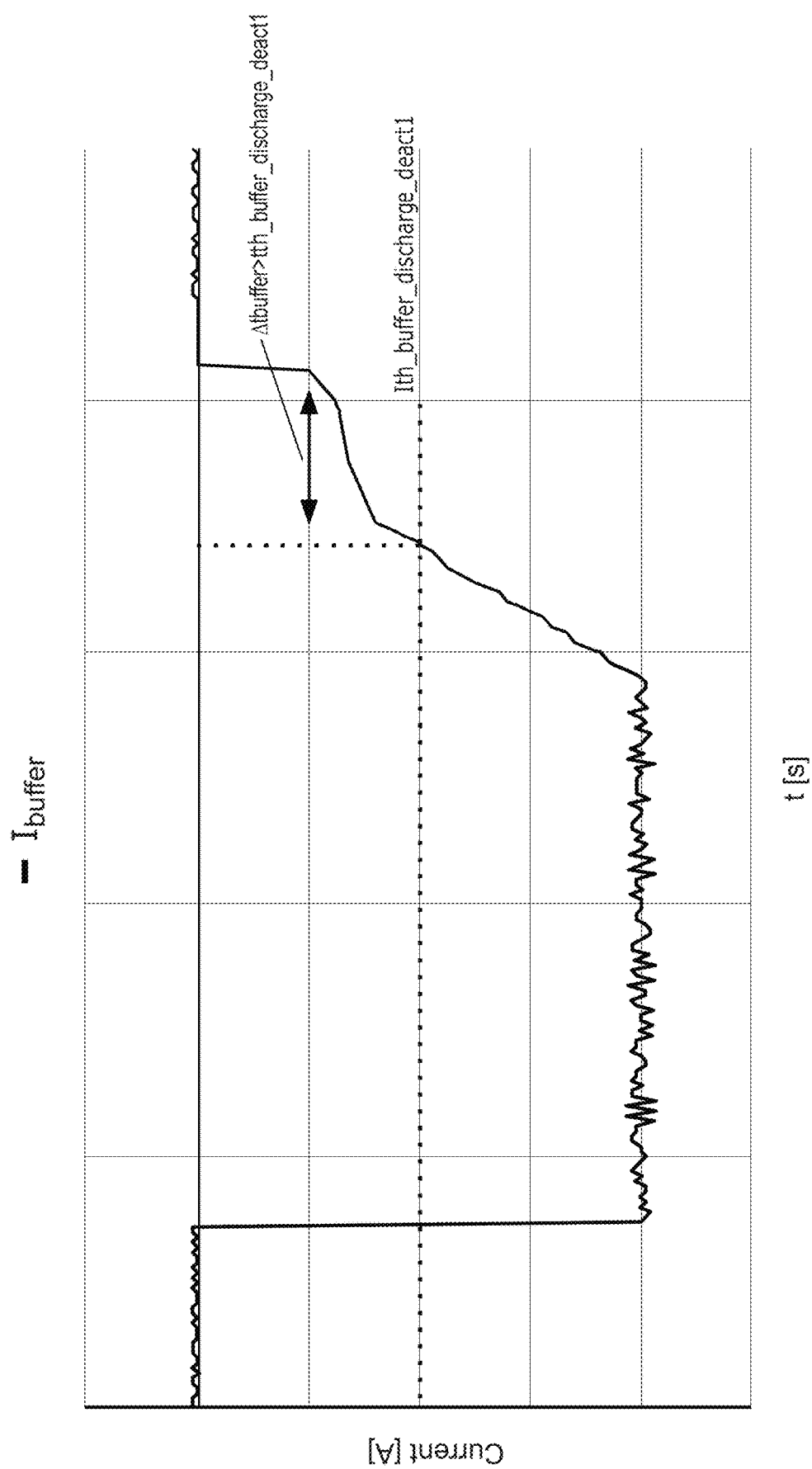
FIG. 3 is a graphic showing a first option of discharge deactivation of the energy buffer module according to the present invention.
Figure 4:
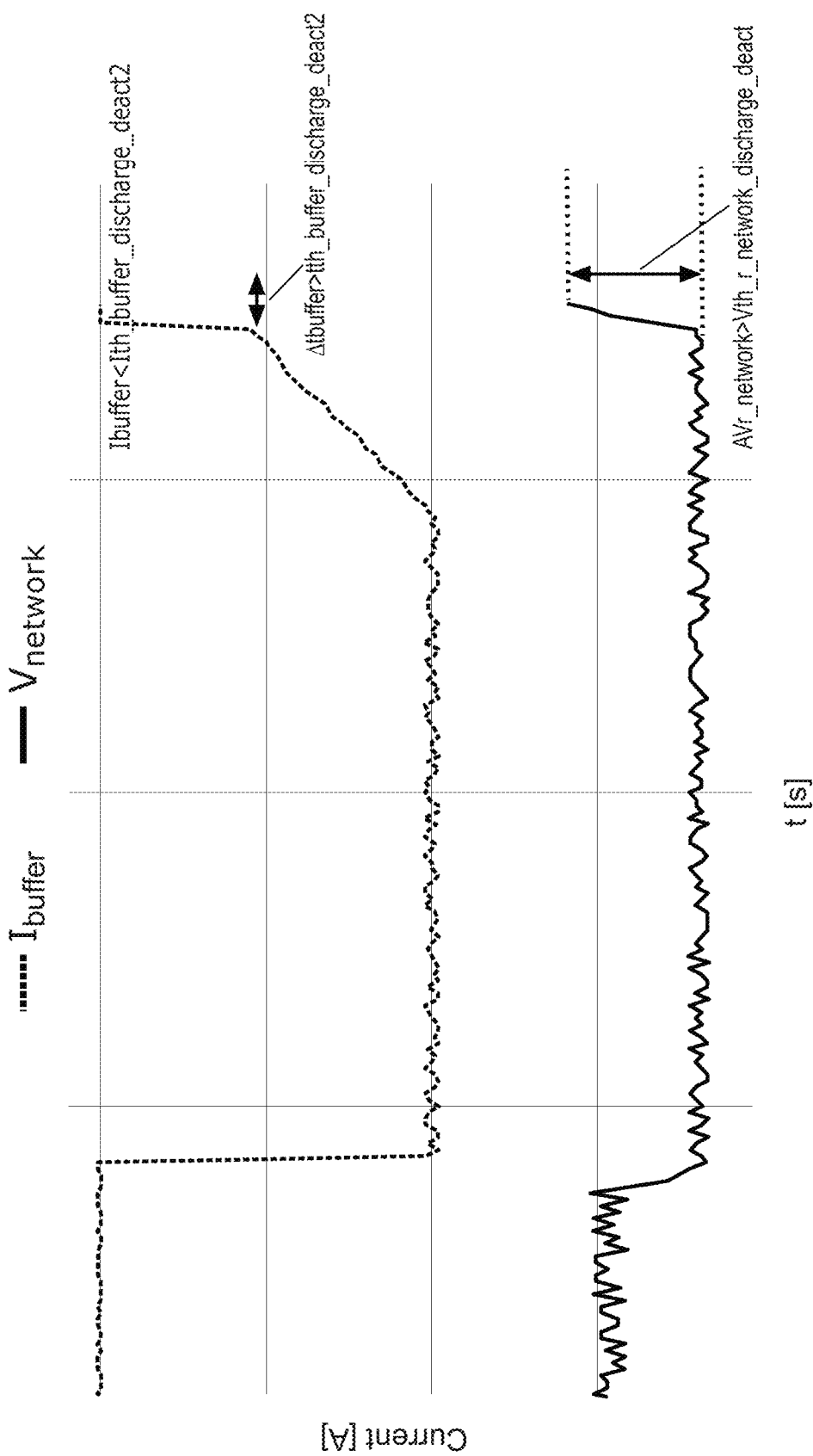
FIG. 4 is a graphic showing a second option of discharge deactivation of the energy buffer module according to the present invention.

The discharge deactivation conditions can be one of the followings:
- the current provided by the energy buffer module ($I_{buffer}$) (1) is lower than a first preset threshold discharge deactivation value ($I_{th\_buffer\_discharge\_deact1}$) during a time ($\Delta t_{buffer}$) higher than a first preset discharge deactivation time ($t_{th\_buffer\_discharge\_deact1}$)—shown in FIG. 3, and
- the charge of the energy storage (3) is lower than a minimum usable charge, and
- the voltage rise variation of the high voltage network ($\Delta V_{r\_network}$) (6) is higher than a preset voltage rise discharge deactivation threshold ($V_{th\_r\_network\_discharge\_deact}$) and the current provided by the energy buffer module ($I_{buffer}$) (1) is lower than a second preset threshold discharge deactivation value ($I_{th\_buffer\_discharge\_deact2}$) during a time ($\Delta t_{buffer}$) higher than a second preset discharge deactivation time ($t_{th\_buffer\_discharge\_deact2}$)—shown in FIG. 4.

Figure 5:
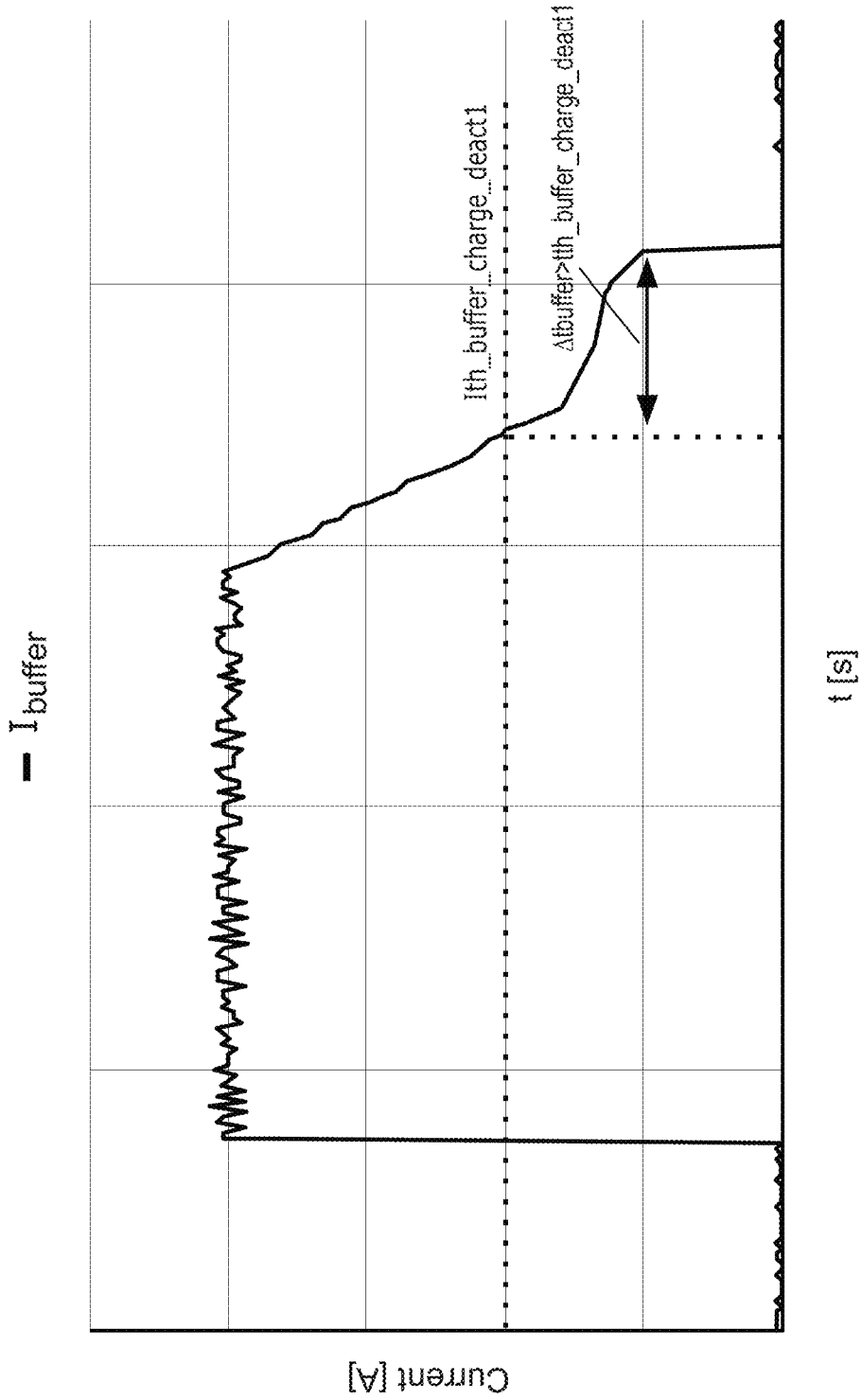
FIG. 5 is a graphic showing a first option of charge deactivation of the energy buffer module according to the present invention.
Figure 6:
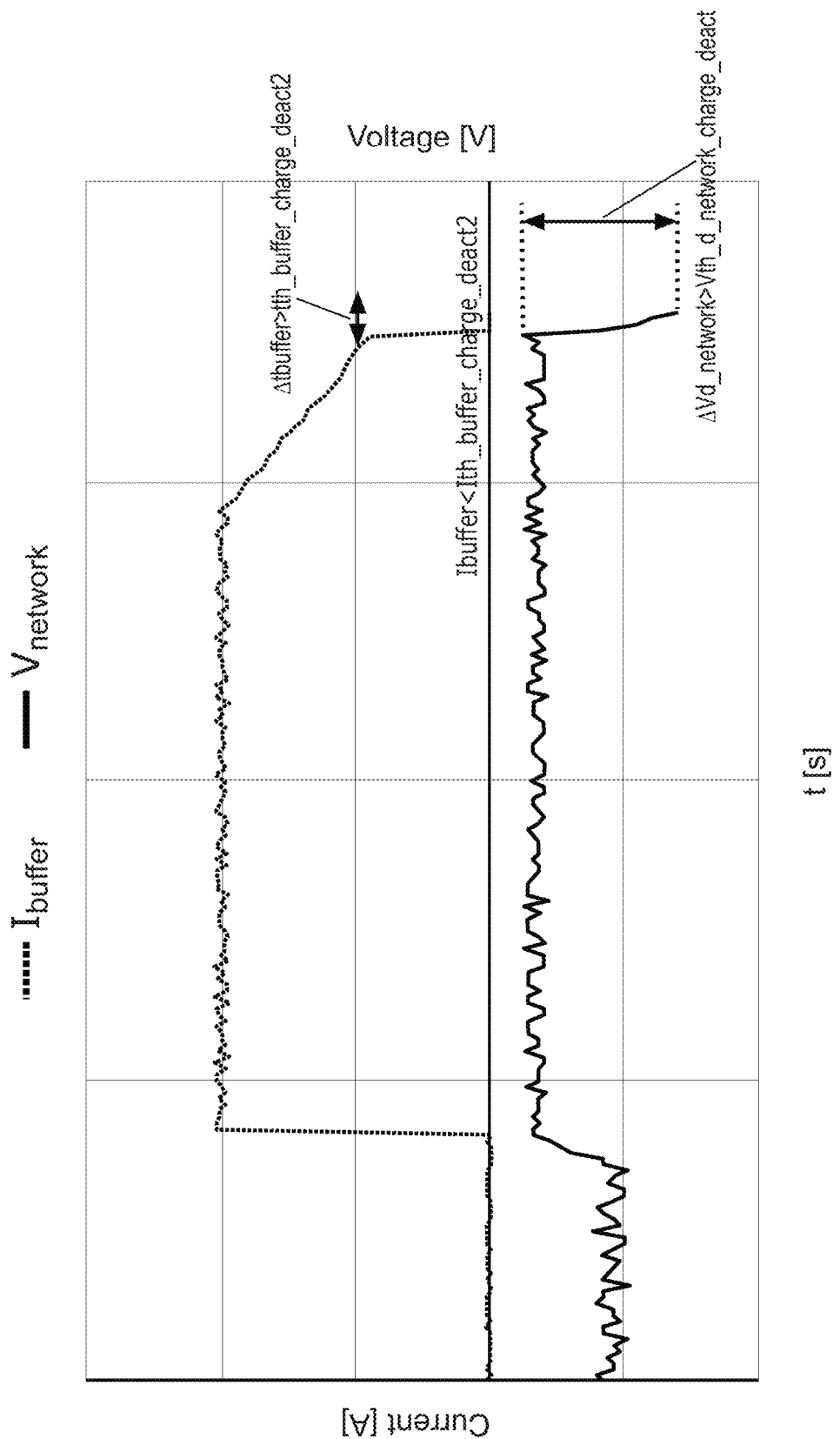
FIG. 6 is a graphic showing a second option of charge deactivation of the energy buffer module according to the present invention.

The charge deactivation conditions can be one of the followings:
- the current provided by the energy buffer module ($I_{buffer}$) (1) is lower than a first preset threshold charge deactivation value ($I_{th\_buffer\_charge\_deact1}$) during a time ($\Delta t_{buffer}$) higher than a first preset charge deactivation time ($t_{th\_buffer\_charge\_deact1}$)—shown in FIG. 5, and
- the charge of the energy storage (3) is higher than a maximum usable charge, and
- the voltage drop variation of the high voltage network ($\Delta V_{d\_network}$) (6) is higher than a preset voltage drop charge deactivation threshold ($V_{th\_d\_network\_charge\_deact}$) and the current provided by the energy buffer module ($I_{buffer}$) (1) is lower than a second preset threshold charge deactivation value ($t_{th\_buffer\_charge\_deact1}$) during a time ($\Delta t_{buffer}$) higher than a second preset charge deactivation time ($t_{th\_buffer\_charge\_deact2}$)—shown in FIG. 6.

Figure 7:
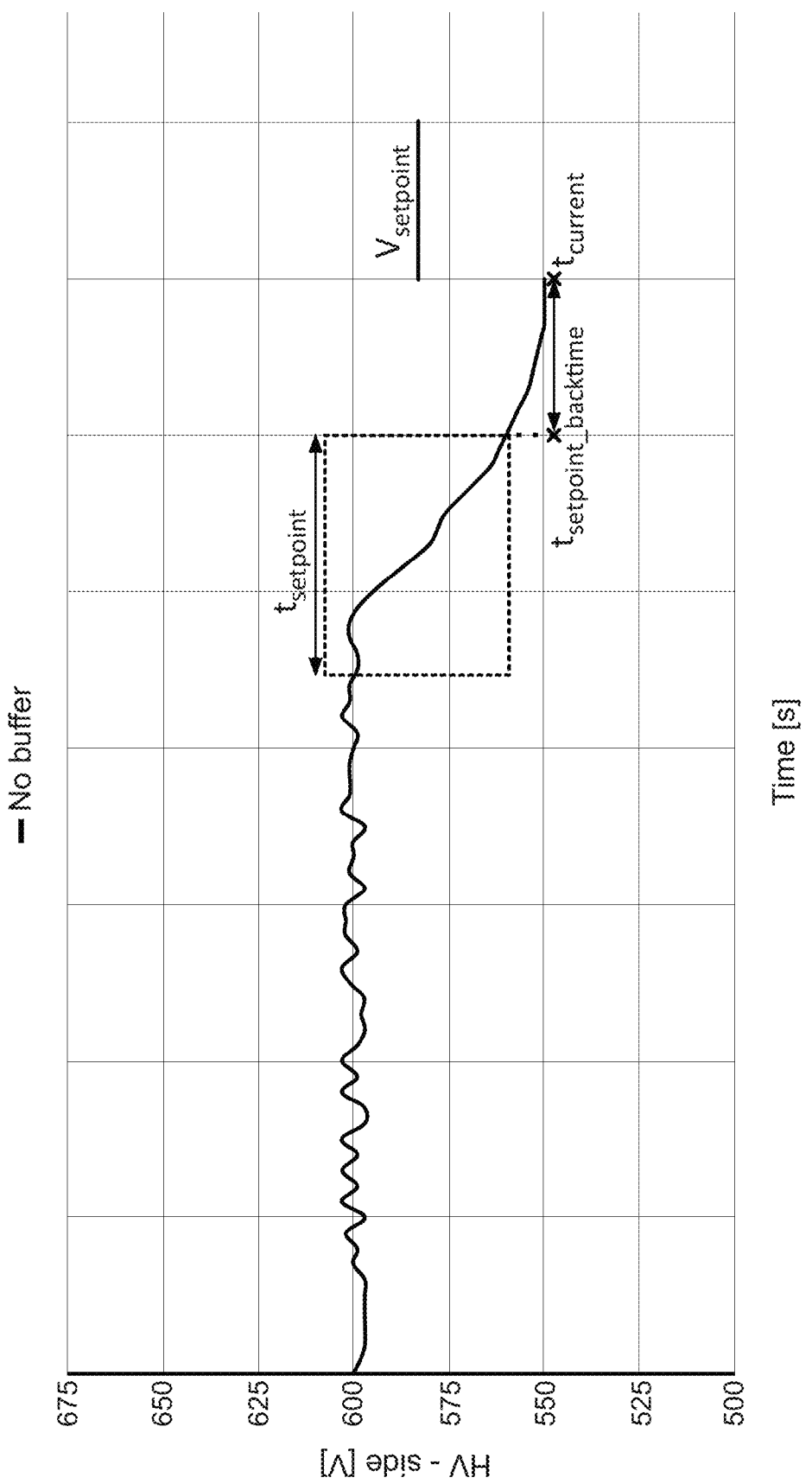
FIG. 7 is a graphic showing an example of the parameters used for the calculation of the fixed voltage set-point.

Preferably, the fixed voltage setpoint ($V_{set-point}$) provided by the energy buffer module (1) is determined from the average of the voltage values of the high voltage network (6) during a preset set-point time range ($t_{set-point}$) established before a preset set-point back-time range ($t_{set\_point\_backpoint}$), said preset set-point back-time range ($t_{set\_point\_backpoint}$) comprising the time passed between the end of the preset set-point time range ($t_{set\_point}$) and the current time ($t_{current}$). FIG. 7 shows an example of the fixed voltage setpoint ($V_{set-point}$) and the preset set-point time range ($t_{set-point}$).

The systems and devices described herein may include a controller or a computing device comprising a processing and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including modules, executed by one or more computers or other devices. Generally, modules include routines, programs, objects, components, data structures, etc., that perform particular tasks or implement particular abstract data types. Typically, the functionality of the modules may be combined or distributed as desired in various embodiments.

It will be appreciated that the systems and devices and components thereof may utilize communication through any of various network protocols such as TCP/IP, Ethernet, FTP, HTTP and the like, and/or through various wireless communication technologies such as GSM, CDMA, Wi-Fi, and WiMAX, is and the various computing devices described herein may be configured to communicate using any of these network protocols or technologies.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An autonomous energy system for an aircraft comprising: a high voltage network configured to provide energy to aircraft electrical loads, a main power source connected to the high voltage network, an energy storage, a voltage-controlled bidirectional DC-DC converter connected to the energy storage and to the high voltage network, and, a power control management system, wherein the power control management system is connected to the high voltage network and is configured to measure for voltage variations in the high voltage network, wherein the power control management system is connected to the energy storage and to the DC-DC converter to form an energy buffer module capable of providing and receiving a determined amount of power by a fixed voltage setpoint to the high voltage network, wherein the power control management system is configured so that when the power control management system detects that a voltage drop variation of the high voltage network is higher than a preset voltage discharge activation threshold during a time higher than a preset time discharge activation value the power control management system provides power from the energy buffer module to the high voltage network until one of the following conditions are met:
  a current provided by the energy buffer module is lower than a first preset threshold discharge deactivation value during a time higher than a first preset discharge deactivation time and
  a charge of the energy storage is lower than a minimum usable charge, and
  a voltage rise variation of the high voltage network is higher than a preset voltage rise discharge deactivation threshold and a current provided by the energy buffer module is lower than a second preset threshold discharge deactivation value during a time higher than a second preset discharge deactivation time, and
wherein the power control management system is further configured so that when the power control management system detects that the voltage rise variation of the high voltage network is higher than a preset voltage charge activation threshold during a time higher than a preset time charge activation value, the power control management system receives power from the high voltage network to the energy buffer module until one of the following conditions are met:
  a current provided by the energy buffer module is lower than a first preset threshold charge deactivation value during a time higher than a first preset charge deactivation time, and
  a charge of the energy storage is higher than a maximum usable charge, and
  a voltage drop variation of the high voltage network is higher than a preset voltage drop charge deactivation threshold and a current provided by the energy buffer module is lower than a second preset threshold charge deactivation value during a time higher than a second preset charge deactivation time.

2. The autonomous energy system according to claim 1, wherein the fixed voltage setpoint provided by the energy buffer module is determined from voltage values of the high voltage network during a preset set-point time range.

3. The autonomous energy system according to claim 2, wherein the fixed voltage setpoint is determined as an average of the voltage values of the high voltage network during the preset set-point time range.

4. The autonomous energy system according to claim 3, wherein the preset set-point time range is established before a preset set-point back-time range said preset set-point back-time range comprising a time passed between an end of the preset set-point time range and a current time.

5. The autonomous energy system according to claim 1, wherein the energy storage and the DC-DC converter are connected in series.

6. The autonomous energy system according to claim 1, wherein the storage is a bank of supercapacitors or lithium-ion batteries.

7. The autonomous energy system according to claim 1, wherein a minimum usable charge of the energy storage is lower than 20% of an entire charge of the energy storage, and a maximum usable charge of the energy storage is higher than 80% of the entire charge of the energy storage.

* * * * *